Sept. 19, 1950    W. RABAK    2,522,961

SEALED CONTAINER

Filed Oct. 24, 1945

INVENTOR.
WILLIAM RABAK
BY
Baldwin Vale
ATTORNEY

Patented Sept. 19, 1950

2,522,961

UNITED STATES PATENT OFFICE 2,522,961

SEALED CONTAINER

William Rabak, Berkeley, Calif.

Application October 24, 1945, Serial No. 624,194

2 Claims. (Cl. 220—47)

This invention relates to sealed containers and more particularly to thermosealed food containers.

Among the objects of the invention is to provide a self opening container responding to temperatures above normal.

Another object is to introduce a safety precaution in the use of impermeable containers such as metal cans, glass and the like, for frozen food and other products for human consumption.

Another object is to provide a self opening container adaptable to both frozen and heat processed products.

Other objects and advantages will appear as the description proceeds. In the specification and the accompanying drawings the invention is disclosed in its preferred form. But it is to be understood that it is not limited to this form, because it may be embodied in modifications within the spirit of the invention as defined in the claim following the description.

The fibrous containers such as cellulosic and other sheet materials in common use in the frozen food art, are unsatisfactory in many respects. Such containers are not sufficiently impervious to retain the degree of moisture required to maintain the high quality and preservation of the flavors, vitamins and other values in frozen foods, medicinal and other products packed therein. Neither do they indicate thawing of the product and its fraudulent refreezing or the breeding of toxic bacterial growth, such as botulinus, and other anaerobic growths, resulting from the thawing of the product within the container.

On the other hand the packing art using glass, cans, and other metal containers in the conventional way, provides a safe and efficacious manner of preserving perishables, and is a cheap and efficient mechanical method. However, it is dangerous to health in the frozen food industry, because it does not indicate in any manner that the frozen contents have been subjected to temperatures above the degree of safety, as described in relation to the fibrous and other containers in common use.

An object of the present invention is to modify the sealing of the common metal or glass container in such a manner that it will automatically spring open when subjected to a temperature above a calibrated limit.

Figure 1:
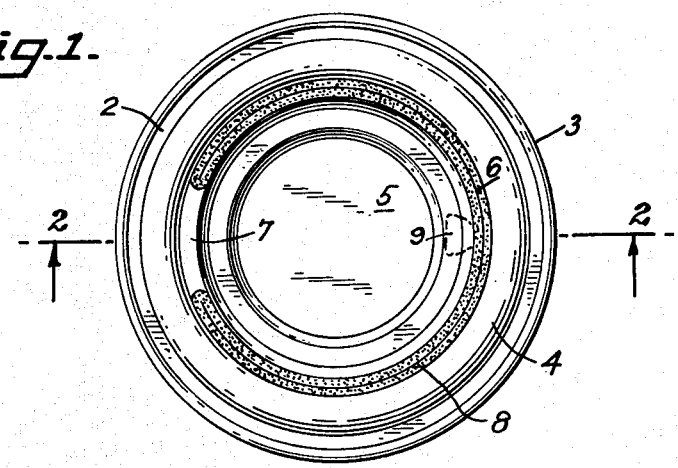
Fig. 1 is a plan view from above of a metal can cover embodying this invention.
Figure 2:
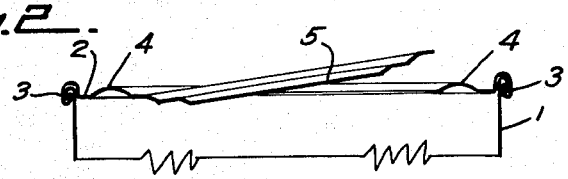
Fig. 2 is a vertical section of the same in the open position.
Figure 3:
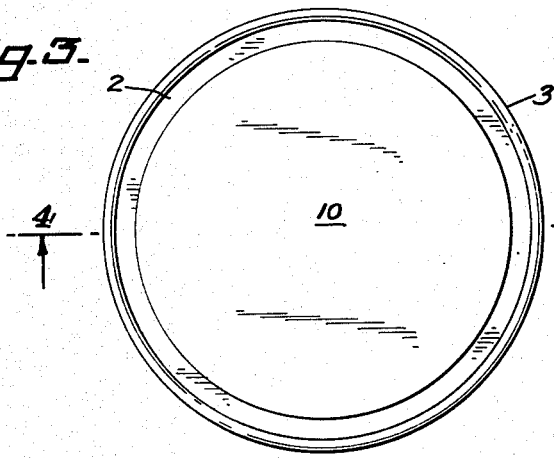
Fig. 3 is a view similar to Fig. 1, and having a protective disk superimposed over the thermosealed spring flap.
Figure 5:
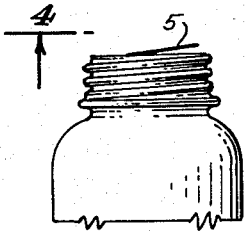
Fig. 5 is a side elevation of a glass container having the invention embodied in its metal cap.
Figure 4:
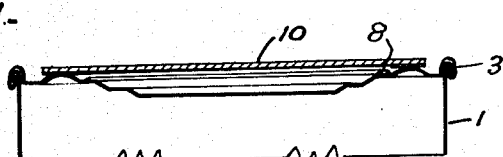
Fig. 4 is a side view of the same in the closed position.

In detail the structure shown in Fig. 2, comprises the conventional "tin can" 1, of any shape and capacity, having the cover 2 attached thereto at 3 by double seaming or otherwise clinched to the peripheral top edge of the can.

This cover is stiffened by the usual upset beads such as 4, die formed in its area. Such cans may be round, square, oval or any of the conventional shapes.

Within this top area 2, an arcuate flap 5 is formed by severing the thickness of the cover on the line 6, except for the spring hinge 7, between the ends of the severance line. This hinge portion may be slightly distorted to give it an inherent stress tending to cause it to normally spring outwardly from the plane of the cover, as in Fig. 2.

This severance line 6 is hermetically sealed by a suitable coating 8, applied to one or both sides of the cover 2, over the severance line. The composition of this sealing coating 8, is selected in accordance with the nature of the contents of the container, and the critical temperature under which the seal will soften and release the flap as shown in Fig. 2.

The sealing composition 8, indicated by stippling, must be odorless, non-toxic, tasteless, and insoluble in the contents of the container. When used as a temperature threshold indicator for frozen foods, the sealing material must have such physical characteristics that at temperatures below 32° Fahrenheit it is strong and durable but not brittle. But at temperatures above 32° F., it softens gradually and releases the flap 5. The softening range can be graduated within a narrow margin by the composition or quality of the seal 8, and the tension applied at 7.

Soft microcrystalline paraffin or modifications thereof are adaptable material for the seal 8, because of their insoluble nature, color and general physical characteristics, also because of their softening and yielding point, enabling exposure to borderline temperatures for short periods without permitting a premature release of the flap 5. Other materials suitable for the purpose are plasticized paraffins, synthetic resins, compounds of rubber or rubber derivatives, and other thermosensitive materials.

It is preferable to use one of several soft microcrystalline paraffins or equal parts of these with firm microcrystalline paraffins the melting points of which are between 100° and 200° F., and softening points between 25° and 50° F., but which are tough, durable and not brittle at temperatures down to minus 30° F. With the use of this type of thermoplastic material, shattering or cracking cannot occur during processing, rough handling or shipping at low temperatures, thus assuring a dependable seal and anchor for the flap 5.

The thermosensitive sealing material above described, relates particularly to products packed in containers for "quick freeze" and other freezing methods at relatively low temperatures.

The invention is equally adaptable to the conventional hot pack methods, without modifying the machinery or method of operation in this highly specialized art. The shape and physical characteristics of the covers such as 2, are in no wise modified, except for the severance 6, which when sealed as described, does not change the plane of the cover.

The thermosensitive seal for hot packing, is modified in the matter of its critical softening or yielding point for releasing the spring flap 5, at relatively higher temperatures, above the degrees of heat applied in processing the product within the containers. That is, above sterilizing temperatures. Such a seal softening at approximately 240° F., will suffice in most cases except where a higher yielding point is required.

Many thermosensitive materials are available for this hot processing, such as plasticized natural or synthetic lacquers, cellulosic derivatives, rubber compounds or derivatives, organic polymers such as polyethylenes, certain amine compounds and other suitable plastics, easily standardized for the purposes.

Depending somewhat on the nature of the contents of the container 1, the thermoplastic anchoring seal 8 may be applied to the inside of the cover 2. Thus insuring a tamperproof seal and serving to prevent contact of the contents with the raw edge of the severance cut 6. It may also be applied to the whole inner area of the cover 2 to serve the additional purpose of sealing the double seaming lock at 3; replacing the usual sealing compound at this area.

The particular advantage of this invention in the heat processed containers, is that they may be opened without a can opener or other mechanical means, by simply warming the container in the oven until the elevated temperature releases the flap 5, permitting access to the contents. In the case of fruit juices, dried foods, confections and the like to be consumed cold, the flap may be easily elevated and completely released by inserting a sharp instrument into the cut 6, to break the seal. Where the extra cost is justified, a bendable tab 9 may be attached to the flap, as indicated in dot-dash lines, permitting the flap to be manually lifted or removed.

The invention is equally applicable to other containers, rigid or semirigid in structure, used in the frozen products art, by the same structure and mode of operation of the thermosensitively sealed flap 5, formed in any suitable portion of the container. In instances where the texture of the container is such that the flap will not automatically open, a metal or other spring element may be added at the hinge portion 7 between the ends of the severance line 6.

In instances where the container may be subjected to rough handling, or excessively elevated temperatures for short periods that would not deleteriously affect the contents, the seal 8 may be protected by the protective disc 10. This disc is preferably composed of paperboard or the like, cemented to the beads 4 and overlying the severance line 6, preventing the accidental depression of the flap 5 in stacking or packing the container. This disc has the further advantages that it thermoinsulates the seal 8 against sudden and temporary rise in temperature for short periods that would not affect the contents of the container, as in transferring the containers in shipment or in storage. It also provides an attractive space for texts explaining the nature of the container and the significance of a broken seal; and instructions for automatically opening the flap 5 by oven temperatures, or mechanical means.

In instance where it is desirable, the flap 5 may be completely severed from the cover and permitted to drop within when the seal 8 softens. Or where the shield 10 is used it may be adhered to the flap 5 disc thus formed and used to lift the disc free of the container when the seal softens.

Having thus described this invention and its mode of operation, what is claimed and desired to secure by Letters Patent is:

1. A container having an interrupted severance line with contacting edges through a wall of said container and forming a flap integrally hinged to said wall and inherently holding said flap at an incline to the plane of said wall; and a thermosensitive plastic coating overlying the surface of said wall and severance line for sealing said severance line and normally holding said flap substantially flush with said wall and adapted to soften at a temperature above a selected degree and release said flap to its said inclined position.

2. A container having a cover with a surrounding flange and an interrupted severance line with contacting edges through the wall of said cover and forming a flap integrally hinged to said wall and inherently holding said flap at an incline to the plane of said cover; a thermosensitive plastic coating overlying the surface of said wall and severance line for sealing said severance line and normally holding said flap substantially flush with said wall and adapted to soften at a temperature above a selected degree and release said flap to its said inclined position; and a relatively nonthermosensitive shield within the margins of said flange above said flap and adhering to said cover.

WILLIAM RABAK.

REFERENCES CITED

The following references are of record in the file of this patent:

UNITED STATES PATENTS

| Number | Name | Date |
|---|---|---|
| 172,553 | Chinnock | Jan. 25, 1876 |
| 629,843 | Allen, Jr. | Aug. 1, 1899 |
| 2,251,187 | Friedman | July 29, 1941 |
| 2,251,345 | Triplett | Aug. 5, 1941 |